US009161117B2

(12) United States Patent
Blonder

(10) Patent No.: US 9,161,117 B2
(45) Date of Patent: Oct. 13, 2015

(54) MULTI-MODE LISTENING APPARATUS

(71) Applicant: IDEA VILLAGE PRODUCTS CORP., Wayne, NJ (US)

(72) Inventor: Greg E. Blonder, Summit, NJ (US)

(73) Assignee: Idea Village Products Corp., Wayne, NJ (US)

( * ) Notice: Subject to any disclaimer, the term of this patent is extended or adjusted under 35 U.S.C. 154(b) by 0 days.

(21) Appl. No.: 14/053,799

(22) Filed: Oct. 15, 2013

(65) Prior Publication Data

US 2014/0254854 A1 Sep. 11, 2014

Related U.S. Application Data

(63) Continuation-in-part of application No. 13/815,538, filed on Mar. 8, 2013.

(51) Int. Cl.

| | |
|---|---|
| ***H04R 25/00*** | (2006.01) |
| ***H04R 1/10*** | (2006.01) |
| ***H04R 5/033*** | (2006.01) |
| *H04M 1/00* | (2006.01) |

(52) U.S. Cl.

CPC ............ *H04R 1/1066* (2013.01); *H04R 1/1075* (2013.01); *H04R 5/0335* (2013.01)

(58) Field of Classification Search

CPC ..... H04M 1/026; H04M 1/0254; H04M 1/05; H04M 1/72575; H04M 1/0216; H04M 1/0237; H04M 1/0283; H04R 1/1041; H04R 1/10; H04R 1/1008; H04R 1/2892; H04R 5/033

USPC .......... 381/74, 370–371, 71.6, 345, 374, 386; 181/171; 379/428.01–433.01; 455/575.1–575.4

See application file for complete search history.

(56) References Cited

U.S. PATENT DOCUMENTS

2003/0182713 A1* 10/2003 Rolla ................................ 2/209
2008/0056525 A1* 3/2008 Fujiwara et al. .............. 381/374
2009/0110226 A1* 4/2009 Ishida ........................... 381/370
2010/0067714 A1* 3/2010 Cheng ............................. 381/74
2011/0206216 A1* 8/2011 Brunner et al. ................. 381/74
2013/0083955 A1* 4/2013 Miyazawa .................... 381/378

* cited by examiner

*Primary Examiner* — Rasha Al Aubaidi
*Assistant Examiner* — Norman Yu
(74) *Attorney, Agent, or Firm* — Dan M. DeLa Rosa

(57) ABSTRACT

A headset apparatus including a headband having two end portions, each of the end portions comprising an angled hinge having two opposing ends. The apparatus further includes at least two speakers, each of the speakers rotatably attached to the two ends of the angled hinged to form two rotary joints, wherein rotation of the speaker about an axis of rotation between the two rotary joints transitions the apparatus between a first listening mode to a second listening mode.

22 Claims, 14 Drawing Sheets

MULTI-MODE LISTENING APPARATUS

CROSS-REFERENCE TO RELATED APPLICATION

This application is a continuation-in-part of U.S. patent application Ser. No. 13/815,538, filed Mar. 8, 2013, which is hereby incorporated by reference herein in its entirety.

FIELD OF THE INVENTION

This invention relates to a music listening and playing apparatus and more specifically, music headphones with rotating speakers and with music listening and playing modes.

DESCRIPTION OF THE RELATED ART

There are various patents covering headphones and headsets. The present disclosure provides for a headset that can be used as a listening device and can convert into a music playing device.

SUMMARY OF THE DISCLOSURE

In one embodiment, the present disclosure provides for a music playing and listening apparatus comprising: a headband having opposing ends; at least two connectors, each of the connectors having at least two arms, a first arm is shorter than a second arm; and at least two speakers, each of the speakers having opposing sides and comprising an audio output element on a first side and a compartment on a second side, the first and second arms of each of the connectors is pivotally attached to a portion of each of the speakers to thereby allow rotation of the speakers, each of the audio output elements of each of the speakers generally face one another during a first listening mode, each of the speakers being rotatable about the first and second arms of each of the connectors to thereby allow each of the audio output elements of each of the speakers to turn away from one another during a second listening mode; the rotation of the speakers allowing for changes in modes.

In another embodiment, the length ratio of the first arm to the second arm of each of the connectors is from about 1:1.1 to about 1:10. In yet another embodiment, the length ratio of the first arm to the second arm of each of the connectors is from about 1:1.25 to about 1:5.

In still another embodiment, each of the speakers rotates about an axis formed by the first and second arms of each of the connectors. In still yet another embodiment, each of the speakers is designed to rotate about the axes during the first listening mode at angles from about 0 degrees to about 100 degrees. In a further embodiment, each of the speakers is designed to rotate about the axes during the first listening mode at angles from about 0 degrees to about 30 degrees. In another further embodiment, each of the speakers is designed to rotate about the axes during the second listening mode at angles from about 20 degrees to greater than 180 degrees. In yet another further embodiment, the speakers are designed to rotate about the axes during the second listening mode at angles from about 30 degrees to about 170 degrees.

In still another further embodiment, the headband is generally situated over a user's head and each of the audio output elements of each of the speakers generally faces the user's ears during the first listening mode.

In still yet another further embodiment, the apparatus is situated around a user's neck and both of the speakers are designed to be rotated and allow each of the audio output elements of each of the speakers to generally face away from the user during the second listening mode.

In another embodiment, the apparatus is set on a surface and the headband is generally parallel to the surface and the speakers are designed to be rotated about the first and second arms of each of the connectors to allow the audio output elements of each of the speaker to generally face away from the surface during the second listening mode.

In yet another embodiment, the length of the second arm relative to the first arm creates an angle between the surface and at least one speaker, and the angle is greater than 1 degree and less than 90 degrees.

In still another embodiment, the length of the second arm relative to the first arm creates an angle between the surface and at least one speaker, and the angle is from about 10 degrees to about 80 degrees.

In still yet another embodiment, each of the connectors comprises a third arm rotatably attached to opposing ends of the headband.

In a further embodiment, the apparatus further comprises a safety interlocking device which is designed to limit the volume output of the speakers in the first listening mode and increases the volume output of the speakers during the second listening mode.

In yet a further embodiment, the speakers lock into place during the second listening mode.

In still a further embodiment, the apparatus further comprises at least two ear cushions, each of the cushions is attached to at least a portion of the audio output element.

In yet a further embodiment, the speakers lock into position when rotated 90 or 180 degrees, but allows for some small movement around 0 degrees (e.g. when the speaker cushion are against the ears) for better fit and comfort.

In still yet a further embodiment, the apparatus further comprises at least one amplifier, and the amplifier is connected to a portion of at least one of the speakers.

In another further embodiment, the apparatus further comprises at least one switching mechanism, and the switching mechanism is activated by rotating each of the speakers from said music listening mode to the second listening mode, and the rotation of the speakers activates the amplifier.

In yet another further embodiment, the apparatus further comprises at least one switching mechanism, and the switching mechanism is activated by rotating one of the speakers from the music playing mode to the second listening mode, and the rotation of one of the speakers deactivates the amplifier.

In still another further embodiment, at least one of the compartments of the speakers provides for storage of a power source. In still yet another further embodiment, the headband provides for storage of a power source. In another embodiment, the apparatus further comprises at least one power source, and the power source is a battery.

In yet another embodiment, the apparatus further comprises an on and off mechanism. In still another embodiment, the apparatus further comprises volume control mechanism, and the volume control mechanism controls audio output volume of the speakers. In yet another embodiment, the apparatus further comprises a cable and an adaptor. In still yet another embodiment, the headband is generally U shaped.

In a further embodiment, the apparatus further comprises a wireless receiver designed to accept audio signals from an external source.

In yet a further embodiment, the present disclosure relates to a listening apparatus comprising: a headband having opposing ends; at least two connectors, each of the connectors having at least two arms, a first arm is shorter than a second arm; at least two speakers, each of the speakers having opposing sides and comprising an audio output element on a first side and a compartment on a second side, the first and second arms of each of the connectors is pivotally attached to a portion of each of the speakers to thereby allow rotation of the speakers, each of the audio output elements of each of the speakers generally face one another during a first listening mode, each of the speakers is designed to be rotated to thereby allow each of the audio output elements of each of the speakers to turn away from one another during a second listening mode; and a safety interlocking device designed to limit the volume output of the speakers in the first listening mode and increases the volume output of said speakers during said second listening mode.

In still a further embodiment, each of the speakers rotates about an axis formed by the first and second arms of each of the connectors, each of the speakers is designed to rotate about the axis during the first listening mode at angles from about 0 degrees to about 100 degrees.

In still yet a further embodiment, each of the speakers rotate about an axis formed by the first and second arms of each of the connectors, wherein each of the speakers is designed to rotate about the axis during the second listening mode at angles from about 20 degrees to greater than 180 degrees.

In another embodiment, the present disclosure provides for a listening apparatus comprising: a headband having opposing ends; at least two connectors, each of the connectors has at least two arms, a first arm is shorter than a second arm, and the first and second arms has a length ratio of from about 1:1.1 to about 1:10; and at least two speakers, each of the speakers having opposing sides and comprising an audio output element on a first side, the first and second arms of each of the connectors is pivotally attached to a portion of each of the speakers to thereby allow rotation of the speakers, each of the audio output elements of each of the speakers generally face one another during a first listening mode, each of the speakers is designed to be rotated to thereby allow each of the audio output elements of each of the speakers to turn away from one another during a second listening mode.

In another embodiment, the present disclosure provides for a listening apparatus comprising a headband comprising two end portions, each of the end portions comprising an angled hinge having two opposing ends; and at least two speakers, each of the speakers rotatably coupled to the two ends of the angled hinged to form two rotary joints, wherein rotation of each of the speakers about a respective axis of rotation between the two rotary joints transitions the apparatus between a first listening mode and a second listening mode.

In an embodiment, the axis of rotation between the two rotary joints of a first speaker of at least two speakers extends at an angle of about 45 degrees relative to a midline axis of the first speaker. In an embodiment, the angled hinge extends at an angle of about 45 degrees relative to a midline axis of the first speaker. In an embodiment, the speakers are configured to rotate about the axis of rotation during the first listening mode in a range of about 0 degrees to about 100 degrees. In an embodiment, the angled hinge and each of the two rotary joints of a first speaker of the at least two speakers substantially limit rotational motion of the two rotary joints to pivot through a substantially circular arc around the respective axis of rotation.

BRIEF DESCRIPTION OF THE DRAWINGS

The accompanying drawings are included to provide a further understanding of the present disclosure. These drawings are incorporated in and constitute a part of this specification, illustrate one or more embodiments of the present disclosure and together with the description, serve to explain the principles of the present disclosure.

Among those benefits and improvements that have been disclosed, other objects and advantages of this disclosure will become apparent from the following description taken in conjunction with the accompanying drawings. The drawings constitute a part of this specification and include exemplary embodiments of the present disclosure and illustrate various objects and features thereof.

DETAILED DESCRIPTION

As required, detailed embodiments of the present disclosure are disclosed herein; however, it is to be understood that the disclosed embodiments are merely exemplary of the disclosure that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present disclosure.

Figure 1:
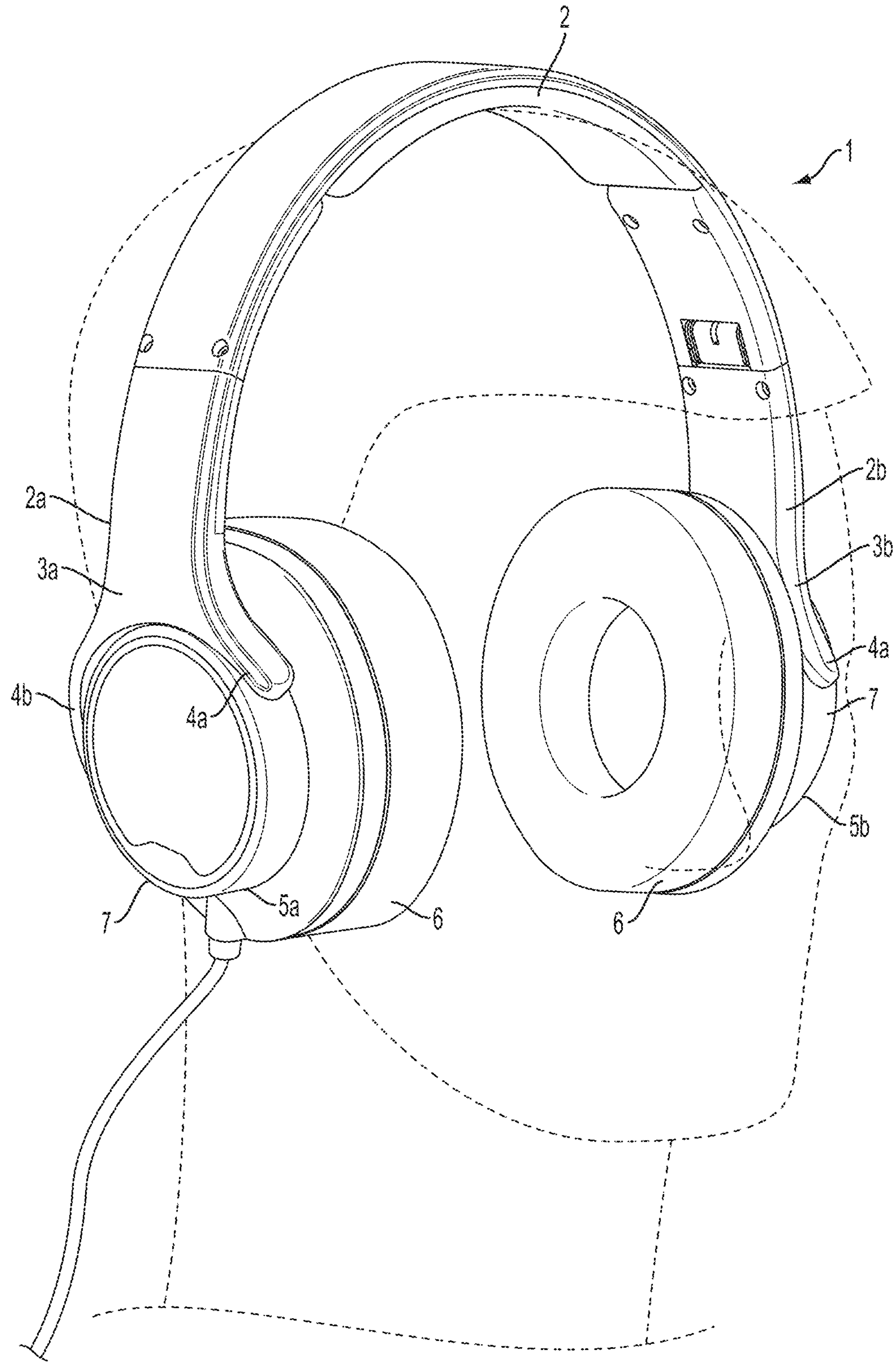
FIG. 1 is a perspective view of the apparatus of the present disclosure in a music listening mode on a user's head.

FIG. 1 illustrates the music listening and playing apparatus 1 of the present disclosure. The apparatus comprises a headband 2 having opposing ends, 2*a* and 2*b* respectively; at least two connectors, 3*a* and 3*b* respectively, each of the connectors has at least two arms, 4*a* and 4*b* respectively. The first arm 4*a* is shorter than a second arm 4*b*.

The apparatus 1 further comprises at least two speakers, 5*a* and 5*b* respectively, each of the speakers having opposing sides and comprising an audio output element 6 on a first side and a compartment 7 on a second side. The first and second arms, 4*a* and 4*b*, of each of the connectors is pivotally attached to a portion of each of the speakers, 5*a* or 5*b*, to thereby allow rotation of said speakers. Each of the audio output elements 6 of each of the speakers, 5*a* and 5*b*, generally face one another during a first listening mode. In the first listening mode, the headband 2 is situated around the user's head and the audio output element 6 of each of the speakers, 5*a* and 5*b*, are generally facing the user's ears.

Figure 2:
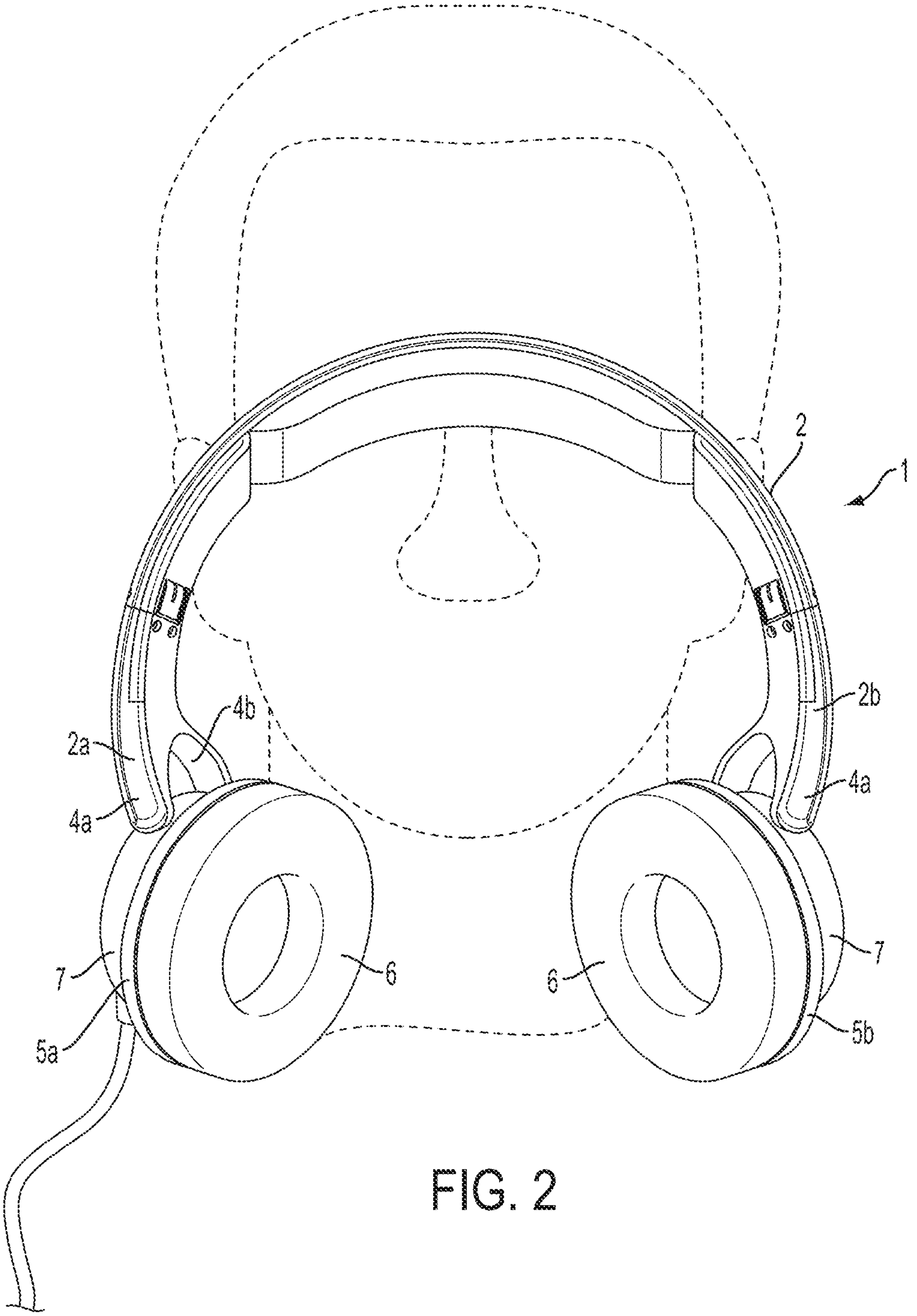
FIG. 2 is a perspective view of the apparatus of FIG. 1 in a music playing mode around a user's neck.

FIG. 2 depicts the second listening mode of the apparatus 1 of the present disclosure. The apparatus 1 may be placed around the user's neck. Each of the speakers, 5*a* and 5*b*, are rotatable about the first and second arms, 4*a* and 4*b*, of each of the connectors, 3*a* and 3*b*, to thereby allow each of the audio output elements 6 of each of the speakers, 5*a* and 5*b*, to turn away from one another during the second listening mode. The rotation of the speakers, 5*a* and 5*b*, allows for changes in modes.

Figure 3:
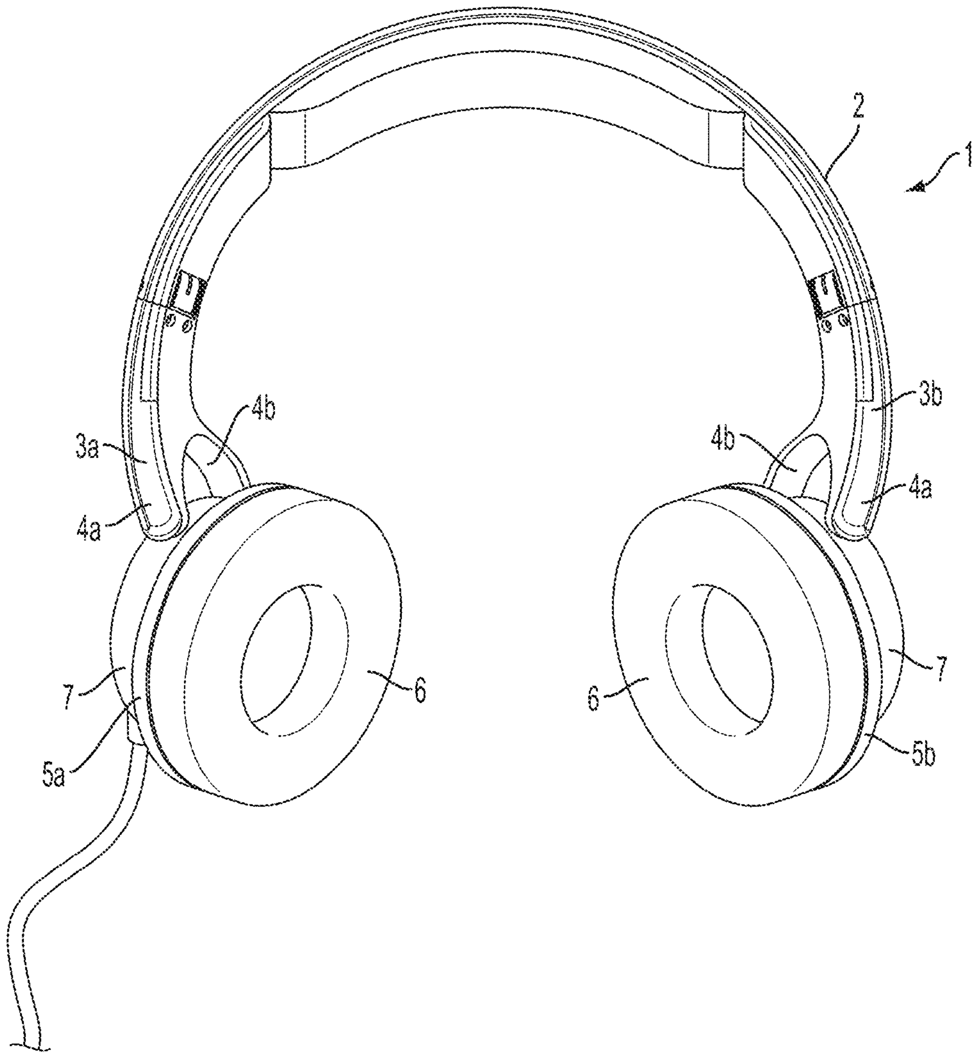
FIG. 3 is a perspective view of the apparatus of FIG. 1 in a music playing mode when the apparatus is place on a surface.

FIG. 3 shows another music playing mode where the apparatus 1 is set on a surface and the headband 2 is generally parallel to the surface 10 and the speakers, 5*a* and 5*b*, are designed to be rotated about the first and second arms, 4*a* and 4*b*, of each of the connectors, 3*a* and 3*b*, to allow the audio output elements 6 of each of the speakers, 5*a* and 5*b*, to generally face away from the surface 10 during the second listening mode.

Figure 4A:
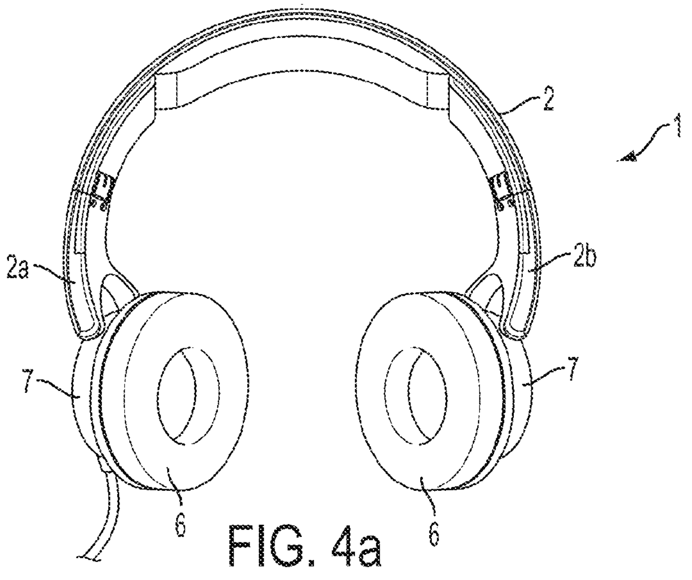
FIG. 4*a-c* are perspective side view of the apparatus showing the rotation of the speakers.
Figure 4B:
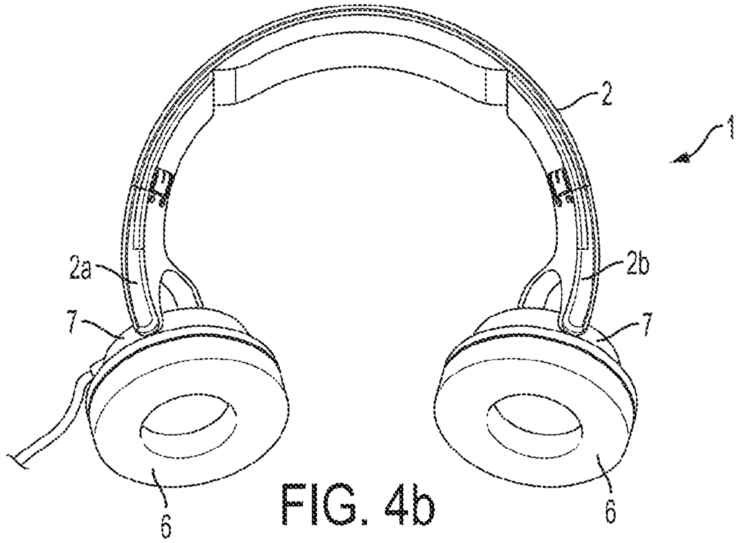
Figure 4C:
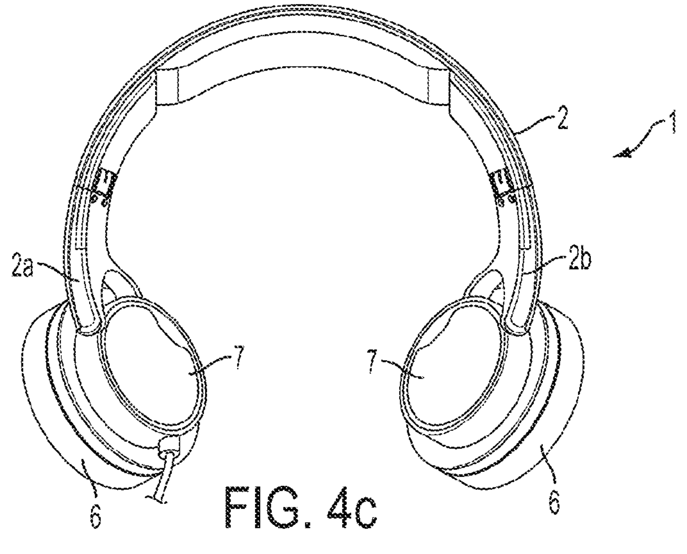

FIGS. 4*a-c* illustrates the rotation of the speaker, 5*a* and 5*b*. During the music listening mode, the audio output element 6 of the speaker 5*a* is generally facing inward as shown in FIG. 4*a*. The speaker 5*a* is rotated outwardly to activate the music playing mode as shown in FIG. 4*b*. In the music playing mode, the speaker 5*a* may be adjusted for optimum sound as shown in FIG. 4*c*. The speaker 5 may then be rotated back to its original position as shown in FIG. 4*a* to return to the music listening mode.

Each of the speakers, 5*a* and 5*b*, rotates about an axis 8 formed by the first and second arms, 4*a* and 4*b*, of each of the connectors, 3*a* and 3*b*. Each of the speakers, 5*a* and 5*b*, is designed to rotate about the axis 8 during the first listening mode at angles from about 0 degrees to about 100 degrees as shown in FIG. 5*a*.

Figure 5B:
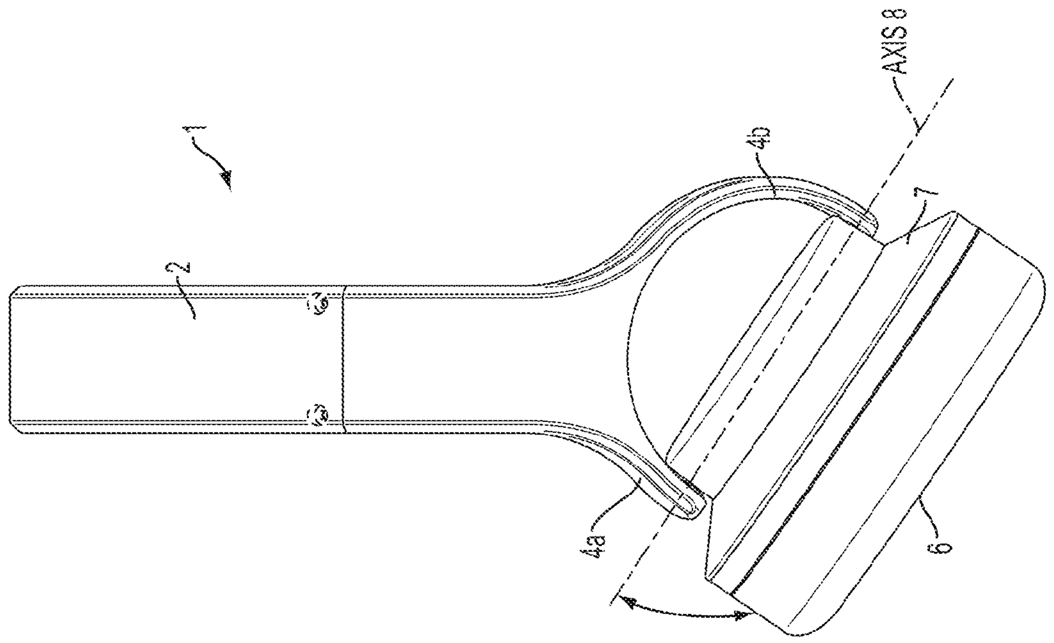
FIG. 5*a-b* are views of the apparatus showing the angles created by the rotation.
Figure 5A:
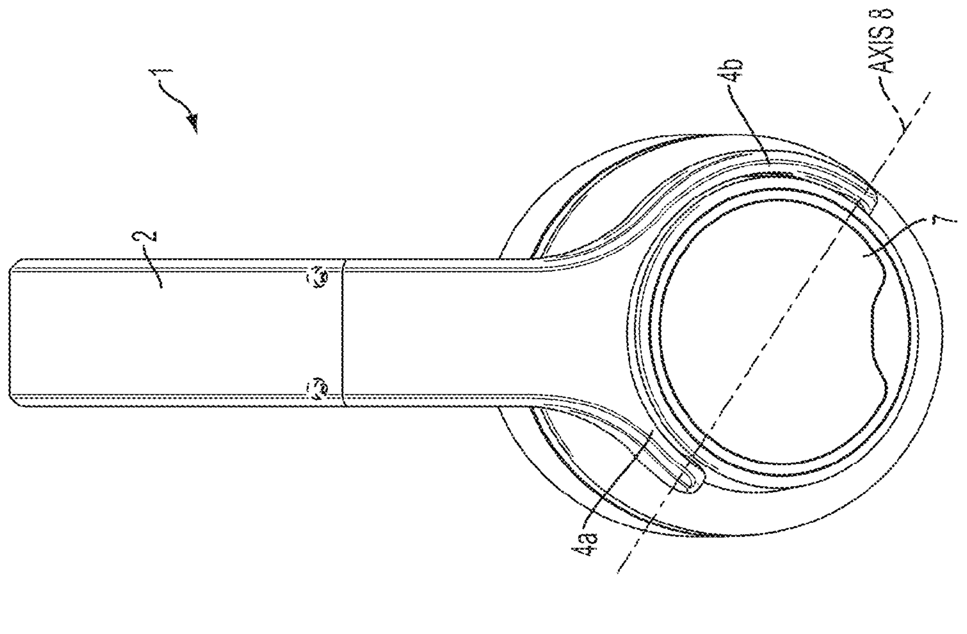

Each of the speakers, 5*a* and 5*b*, is designed to rotate about the axis 8 during the second listening mode at angles from about 20 degrees to greater than 180 degrees as shown in FIG. 5*b*.

Figure 6:
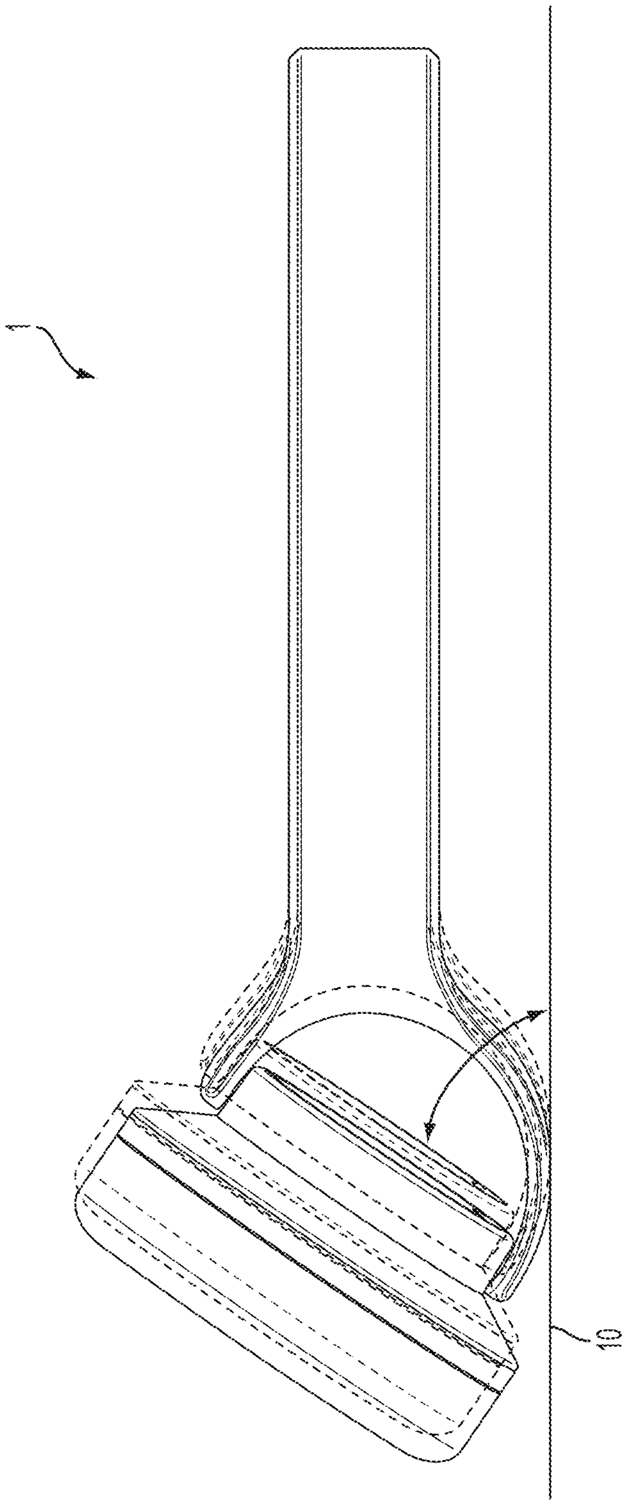
FIG. 6 is view of the apparatus in FIG. 3 showing how the differing length of the arms create angles between the speaker and the surface.
Figure 7A:
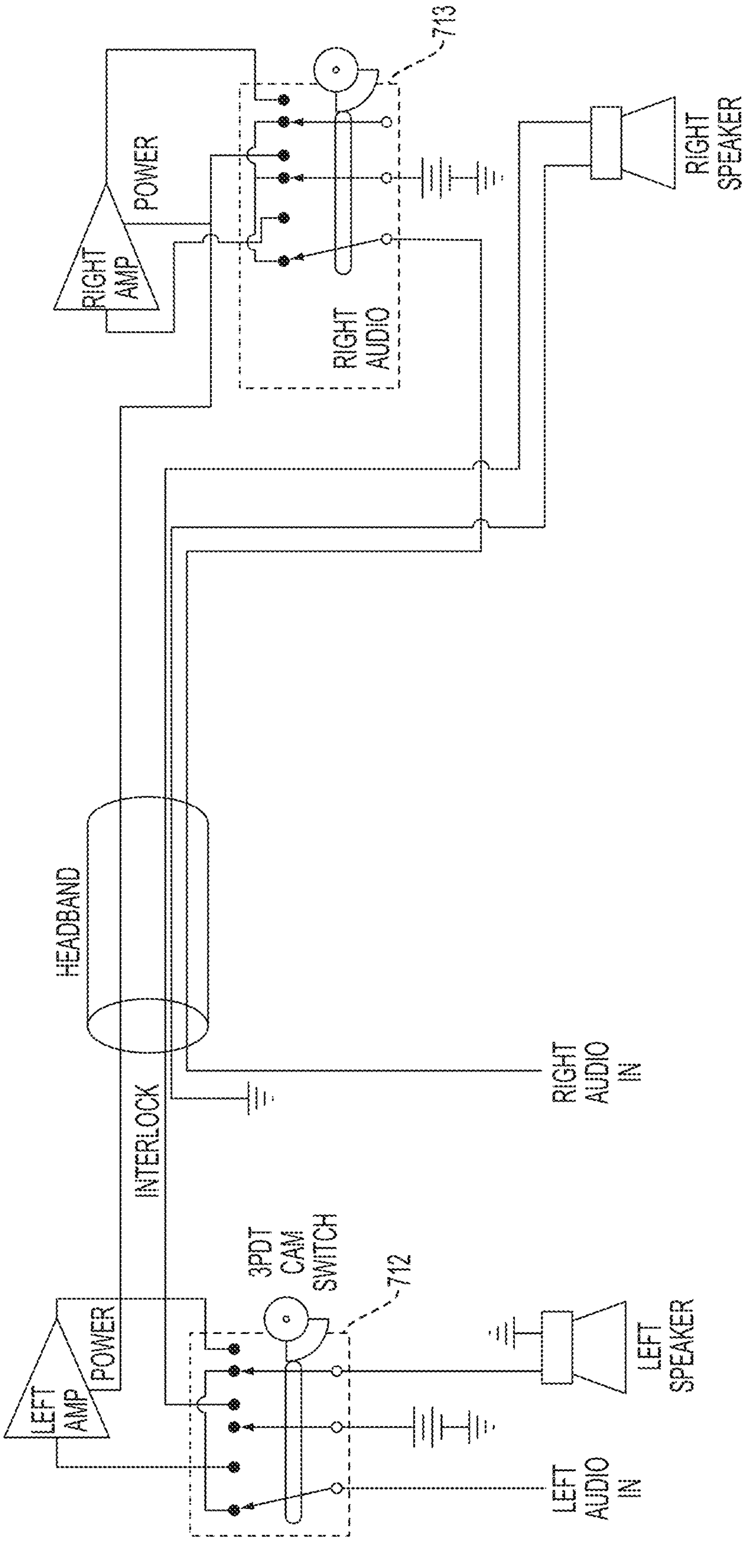
FIG. 7*a-b* are schematic view of one of the embodiments of the switch mechanism.
Figure 7B:
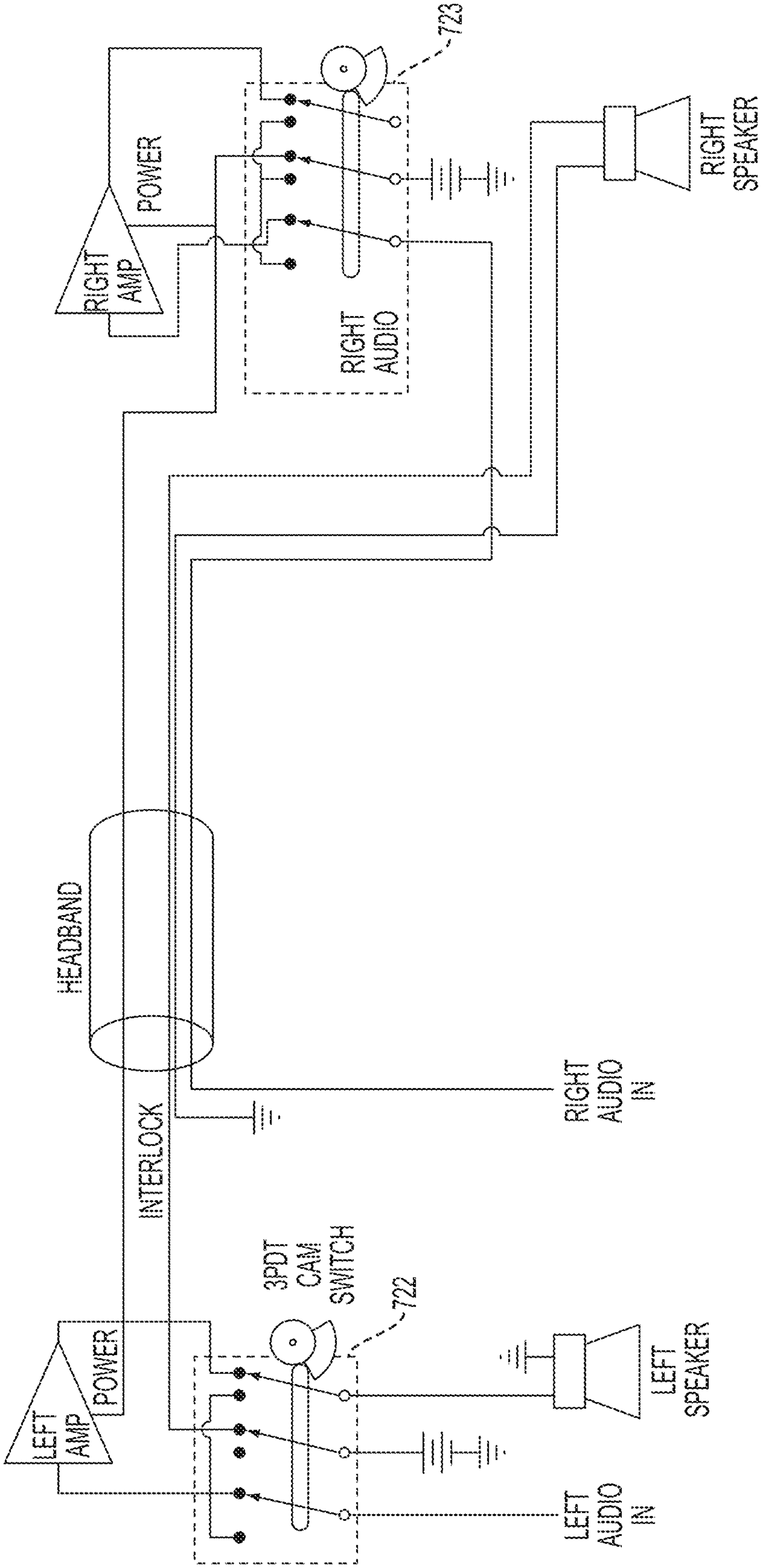

FIG. 6 shows that differing the length ratios of the arms, 4*a* and 4*b*, create different angles between the speaker 5*a* and surface 10. The length of the second arm 4*b* relative to the first arm 4*a* creates an angle between the surface 10 and at least one speaker 5, and the angle is greater than 1 degree and less than 90 degrees. FIGS. 7*a-b* are schematic diagrams of one of the embodiments of the circuitry of the present disclosure. In this embodiment, the cam switch 712 (shown schematically) has three contacts on the input, and six on the output (a three pole double throw switch-3PDT).

When the axle is not rotated and the product is worn as a headset, the switch connects the left audio channel directly to the left speaker, and the right audio channel to the right speaker, and does not route power to the amplifier. The music device powers the acoustic transducer directly. The cam's profile determines the angle at which the switch is activated, and thus the angle at which the mode is switched from headset mode to speaker mode. In this example, the cam is set at 30 degrees, but could be set anywhere from 20 to 110 degrees.

In this example, once the enclosures are rotated by more than 30 degrees, the two 3PDT switches 722 and 723 are thrown closed. This now routes the left audio signal to the left amplifier and the output of the left amplifier to the left speaker (and similarly for the right channel). It also provides power to the amplifier by running the power through the right enclosure switch in series—thus assuring both switches must be closed (and thus the speakers aimed safely away from the ears) before energizing the amplifier.

There are other variations and embodiments of the circuit. In another embodiment, the switch could contain one input and one output, used to trigger a solid state relay that provides all the aforementioned audio and power routing. In a further embodiment, the switch might be used to control the volume level, so it is low as a headset and high as a speaker. Embodiments of the present disclosure can be used with any applicable circuitry and is not limited to the circuitry shown in FIG. 7.

Figure 8:
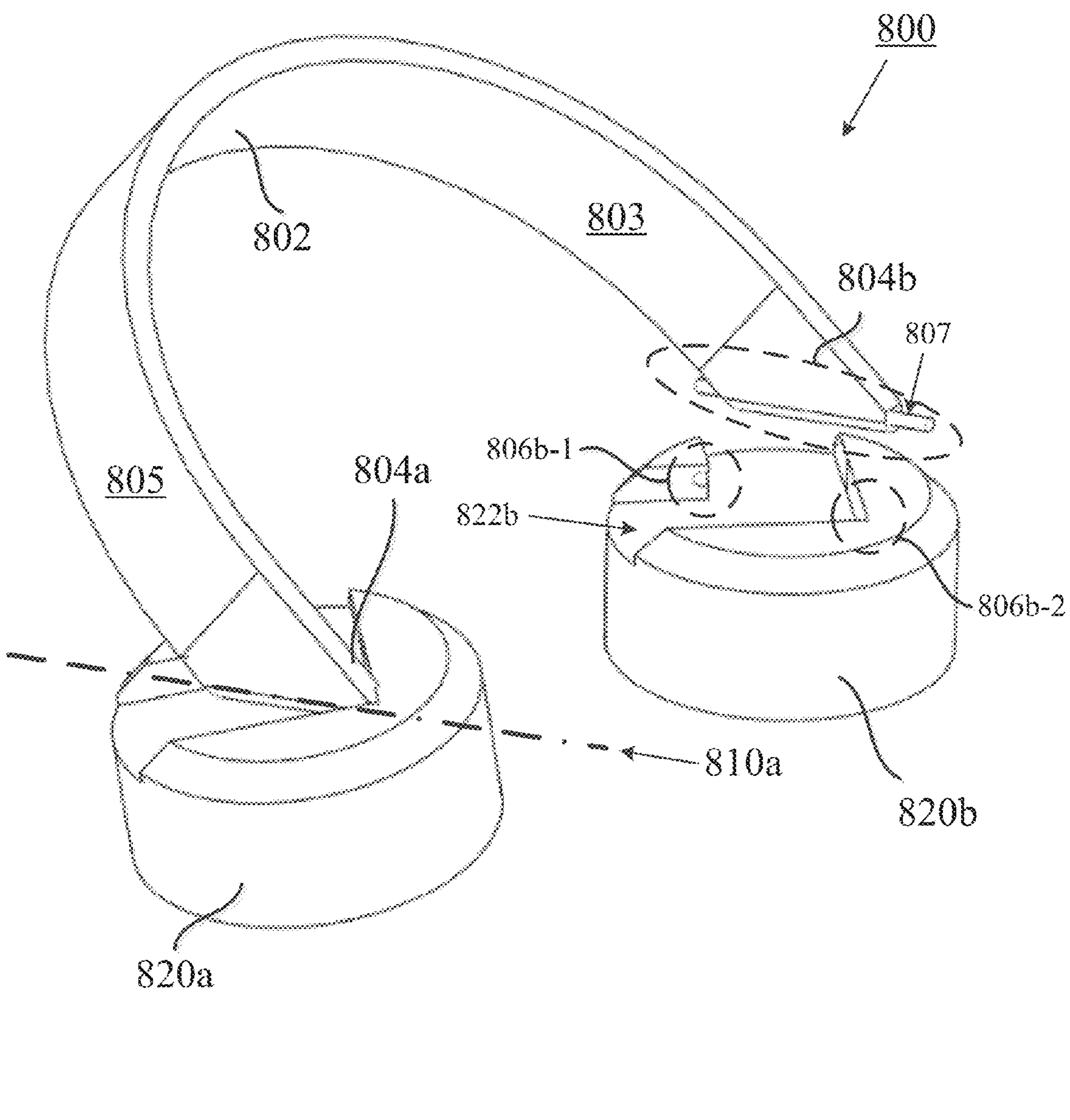
FIG. 8 is a perspective view of an exemplary apparatus including an angled hinge, according to aspects of the present disclosure.

FIG. 8 illustrates an exemplary listening apparatus 800 according to embodiments of the present disclosure. The apparatus 800 includes a headband 802 having two opposing end portions, each configured to couple with a respective speaker 820*a*, 820*b*. In an embodiment, the end portions of the headband 802 each include an angled hinge 804*a* and 804*b* configured to rotatably couple to the respective speakers 820*a*, 820*b*. As shown in FIG. 8, angled hinge 804*b* is configured to couple to speaker 820*b* to form two rotary joints (e.g., a location of the rotary joints upon coupling of the angled hinge 804*b* and the speaker 820*b* is represented by identifiers 806*b*-1 and 806*b*-2 in FIG. 8). For purposes of illustration, the angled hinge 804*b* is shown as de-coupled from the corresponding speaker 820*b*, while the angled hinge 804*a* is shown as rotatably coupled to the speaker 820*a*.

In an embodiment, each angled hinge 804*a*, 804*b* includes two opposing ends (e.g., end 807) configured to couple with the respective speaker 820*a*, 820*b*. For example, as shown in FIG. 8, each of the opposing ends of the angled hinge 804*a*, 804*b* may include a male member (e.g., end 807) configured to couple with a corresponding female member of the speaker 820*b*. In an embodiment, the two rotary joints formed by the angled hinge 804*b* and the speaker 820*b* enable the rotation of the speaker 820*b* relative to the headband 802 to transition the apparatus 800 from the first listening mode to the second listening mode. The apparatus of claim 1, wherein the angled hinge and each of the two rotary joints of a first speaker of the at least two speakers substantially limit rotational motion of the two rotary joints to pivot through a substantially circular arc around the respective axis of rotation.

Figure 9A:
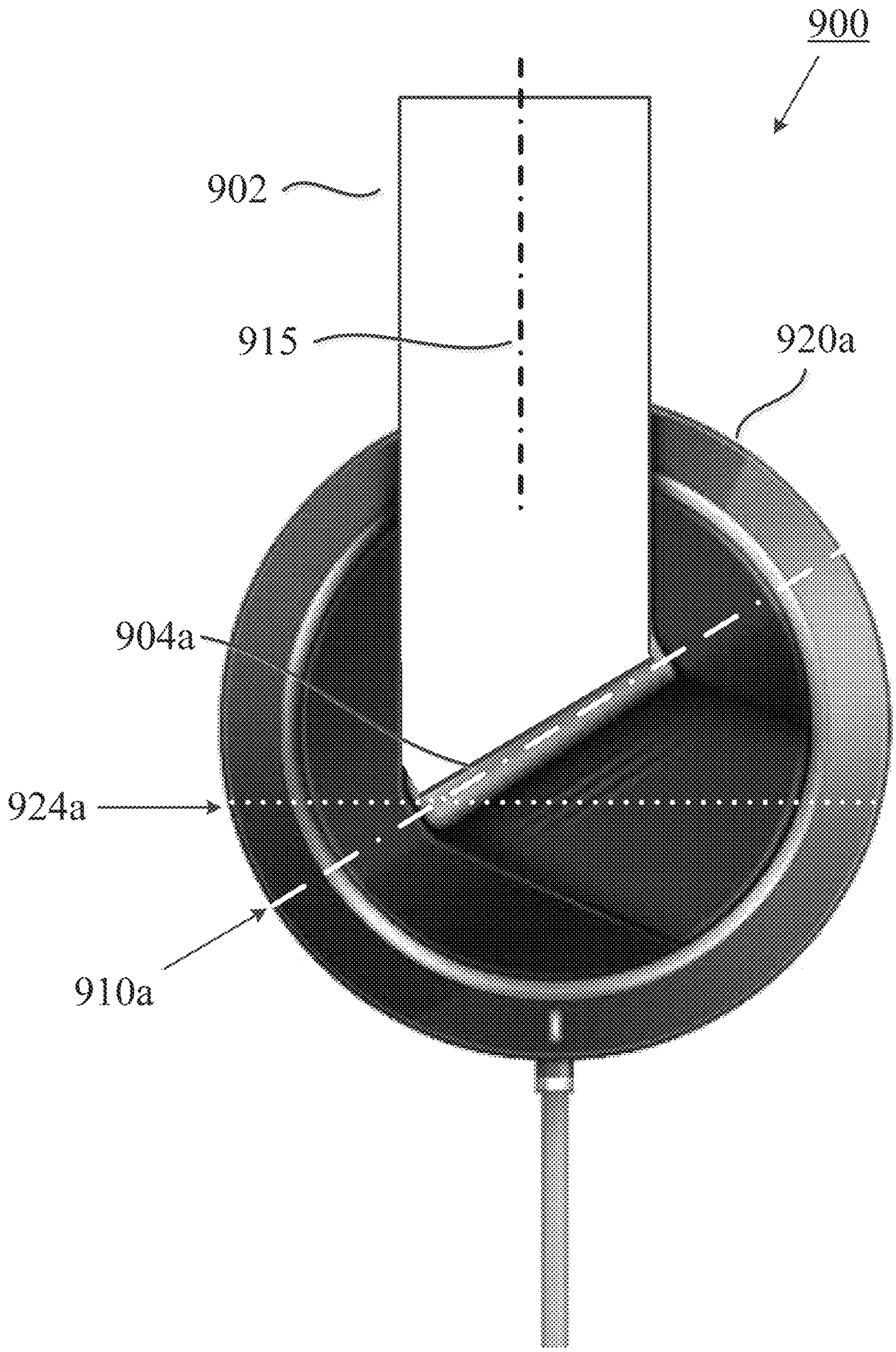
FIG. 9*a* is a perspective view of an exemplary apparatus including an angled hinge, according to aspects of the present disclosure.
Figure 9B:
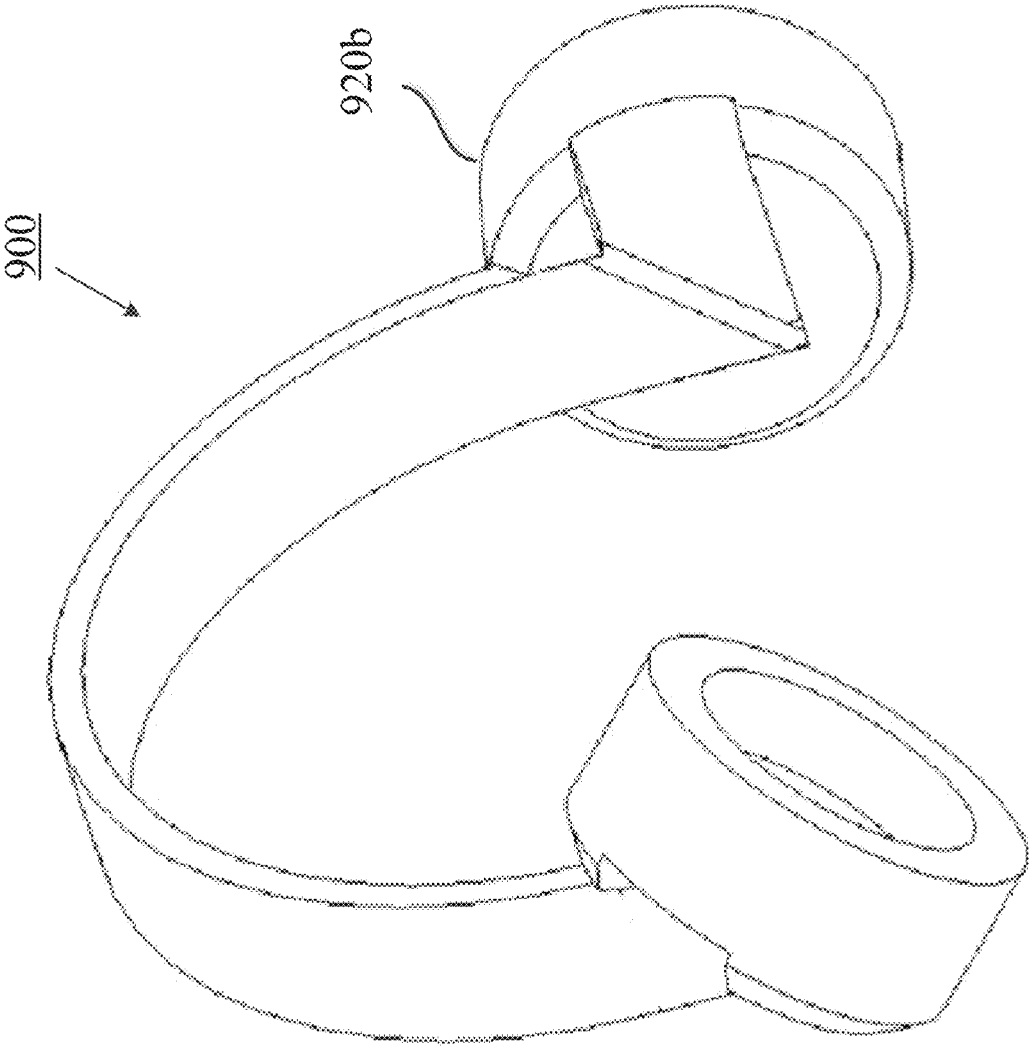
FIG. 9*b* is a perspective view of an exemplary apparatus including an angled hinge, according to aspects of the present disclosure.

As shown in FIG. 8, the rotary joints 806*b*-1 and 806*b*-2 formed by the coupling of the angled hinge 804*b* to the speaker 820*b* are aligned along an axis of rotation between the two rotary joints. In operation, movement of the speaker 820*b* relative to the headband 802 results in the rotation of the speaker about the axis of rotation between the two rotary joints. For example, the coupling of the angled hinge 804*a* and the speaker 820*a* permits rotation of the speaker 820*a* about the axis of rotation 810*a* to enable transition of the apparatus 800 from a first position to a second position. For example, FIG. 9*a* illustrates a speaker 920*a* in a position corresponding to the first listening mode, and FIG. 9*b* illustrates a speaker 920*b* in a position corresponding to the second listening mode. In an embodiment, the angled hinge 804*a* and rotary joints of the speakers 820*a*, 820*b* substantially limit rotational motion of the two rotary joints to pivot through a substantially circular arc around the respective axis of rotation.

With reference to FIG. 8, in an embodiment, each speaker 820*a*, 820*b* includes a channel (e.g., channel 822*b* of speaker 820*b*) configured to accept and/or receive a corresponding end portion of the headband 802 upon fully rotation of the speaker 820*b* into its substantially outwardly facing position (e.g., wherein the two speakers 820*a*, 820*b* substantially face away from one another and the apparatus 800 is in the second listening mode). In operation, when the speakers 820*a*, 820*b*, are translated into the second listening mode, the corresponding end portions of the headband 802 mate with the corresponding channel (e.g., channel 822*b* of speaker 820*b*) of the speaker 820. In an embodiment, an inner surface 803 of the end portion of the headband 802 makes contact with the speaker 820 within the channel (e.g., channel 822*b* of speaker 820*b*) when the apparatus is in the first listening mode (see, e.g., FIG. 9*a* showing an exemplary apparatus 900 in the first listening mode wherein the inner surface of the end portion of the headband 902 is in contact with the speaker 920*a* within a channel.

In an embodiment, an outer surface 805 of the end portion of the headband 802 makes contact with the speaker 820 within the channel (e.g., channel 822*b* of speaker 820*b*) when the apparatus 800 is in the second listening mode. In an embodiment, transitioning the speakers 820*a*, 820*b* from a position corresponding to the first listening mode (wherein the inner surface 803 of the headband 802 is in contact with the speaker 820*a*, 820*b* within the channel) to a position corresponding to the second listening mode (wherein the outer surface 805 of the headband 802 is in contact with the speaker 820*a*, 820*b* within the channel) includes rotation of the speaker 820*a*, 820*b* about the axis of rotation (e.g., the axis of rotation 810*a* corresponding to speaker 820*a*) between the two rotary joints.

According to embodiments of the present disclosure, the angled hinges 804*a* and 804*b* rotatably couple to the respective speakers 820*a* and 820*b* according to any suitable coupling mechanism to enable the formation of the two rotary joints 806*b*-1 and 806-2 such that the coupling permits the transition of the apparatus 800 between the first listening mode and the second listening mode.

FIG. 9*a* illustrates a side view of an exemplary apparatus 900 including a headband 902 having an end portion including an angled hinge 904*a* rotatably coupled to a speaker 920*a*, according to embodiments of the present disclosure. The apparatus 900 in FIG. 9*a* is depicted in the first listening mode, wherein an inner surface of an end portion of the headband 902 is in contact with the speaker 920*a* within a channel. In an embodiment, the apparatus 900 two rotary joints formed at respective coupling points between the angled hinge 904*a* and the speaker 920*a*. In an embodiment, the axis of rotation 910*a* is formed between the rotary points about which the speaker 920*a* may be rotated relative to the headband 902. As shown in FIG. 9*a*, the axis of rotation 910*a* extends at an angle relative to a midline axis 924*a* of the speaker 920*a*. In an embodiment, the midline axis 924*a* represents a central axis which is perpendicular to a longitudinal axis 915 of the headband 902. In an embodiment, the axis of rotation 910*a* extends at an angle of about 45 degrees relative to the midline axis 924*a*. According to one or more embodiments of the present disclosure, the axis of rotation 910*a* extends at an angle corresponding to an angle of the angled hinge 904*a* relative to the midline axis 924*a* of the speaker 920*a*.

Figure 10:
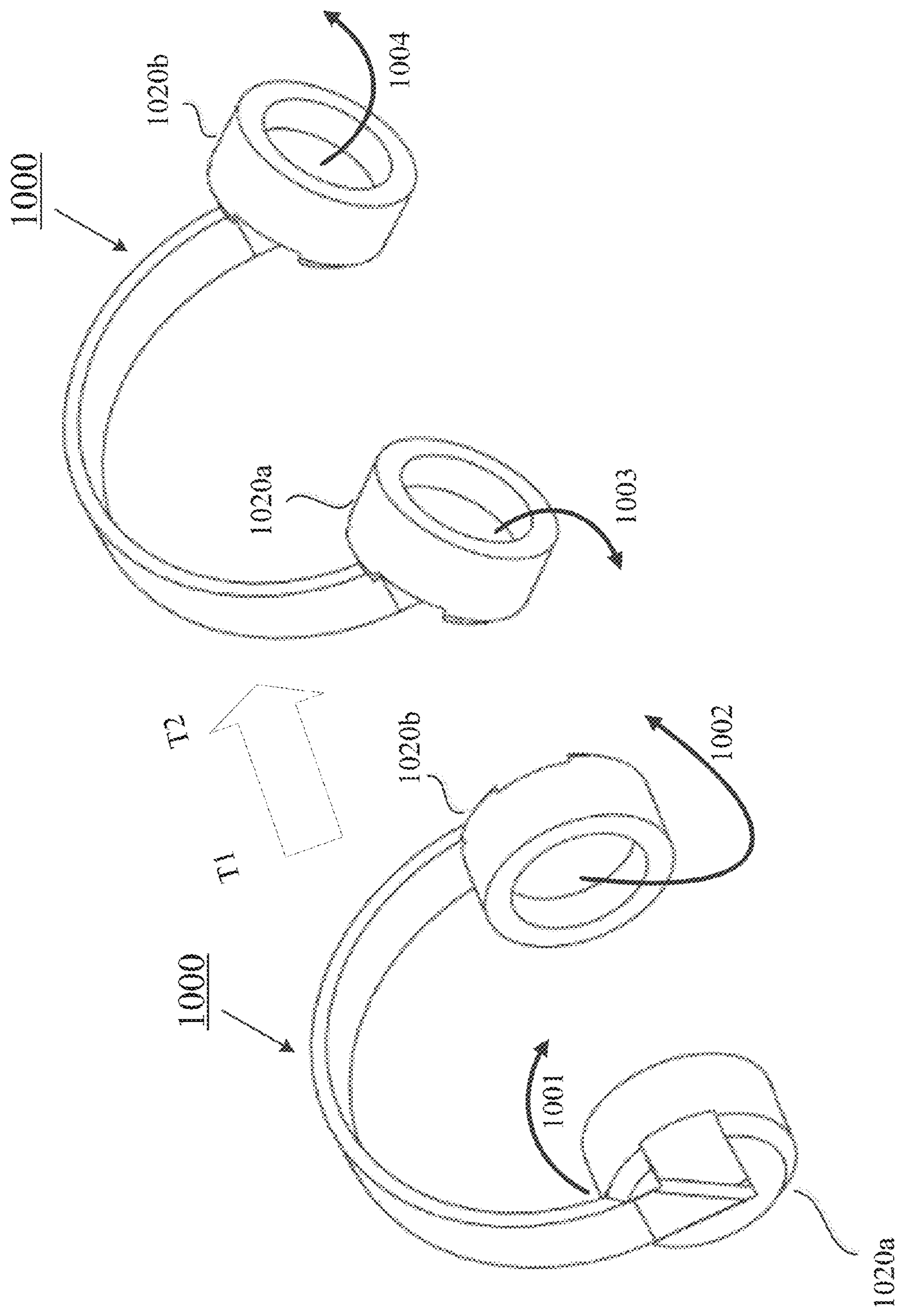
FIG. 10 depicts perspective views of an exemplary apparatus including an angled hinge, according to aspects of the present disclosure.

FIG. 10 depicts a perspective views of an exemplary apparatus 1000 in the first listening mode at a first time (e.g., T1) as the speakers 1020*a*, 1020*b* are rotated to a position at a second time (e.g., T2). As shown in FIG. 10, speaker 1020*a* is rotated in a rotational direction 1001 and speaker 1020*b* is rotated in a rotational direction 1002 at T1. In the example shown in FIG. 10, at T2, rotation of speaker 1020*a* continues in a rotational direction 1003 and rotation of speaker 1020*b* continues in a rotational direction 1004.

Figure 11:
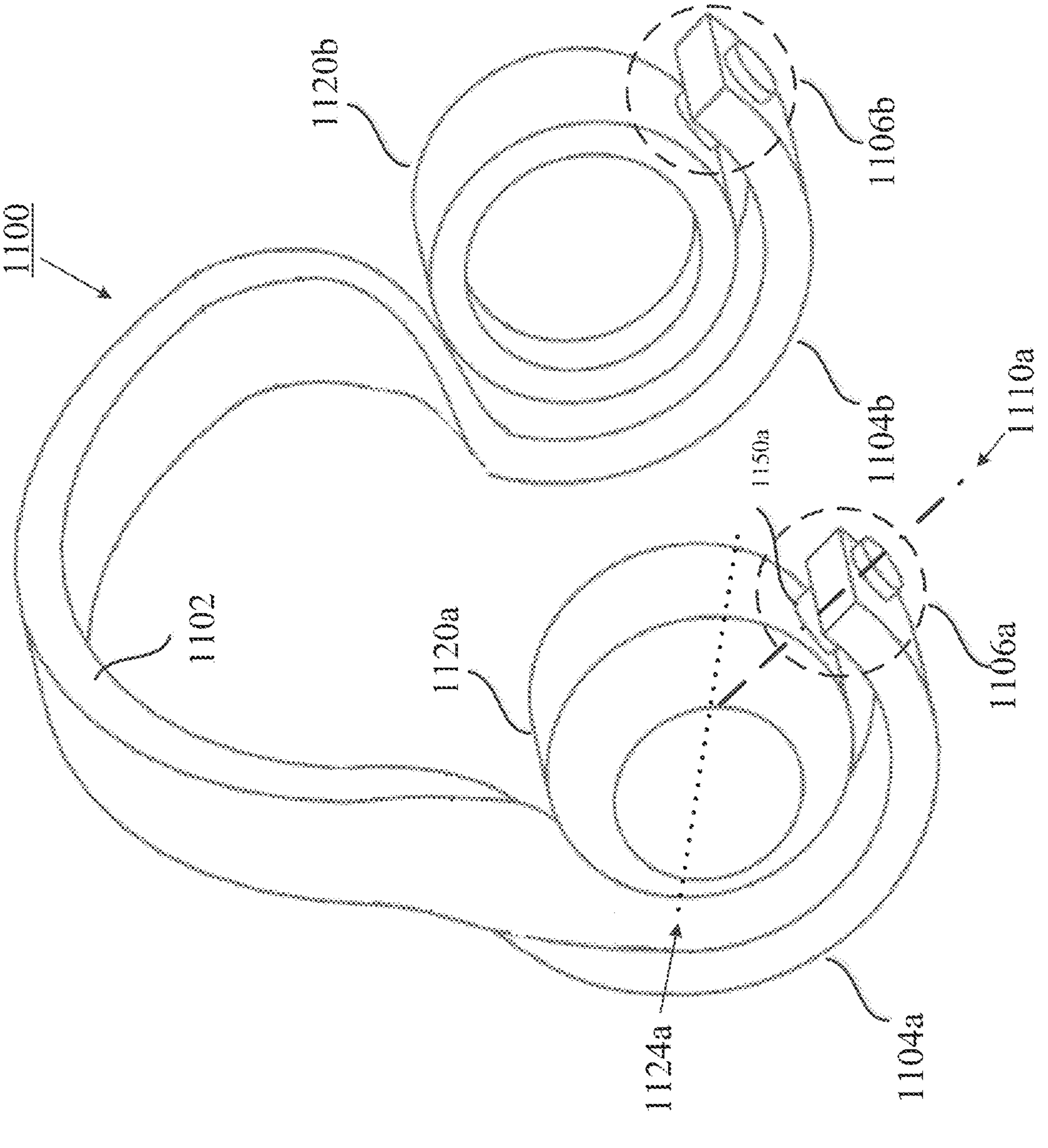
FIG. 11 is a perspective view of an exemplary apparatus including a headband having arm portions coupled to a respective speaker at a coupling junction, according to aspects of the present disclosure.

FIG. 11 illustrates an exemplary music listening and playing apparatus 1100 according to embodiments of the present disclosure. The apparatus 1100 includes a headband 1102 having two arm portions 1104*a*, 1104*b*, each configured to couple with a respective speaker 1120*a*, 1120*b*. In an embodiment, each arm 1104*a*, 1104*b* of the headband 1102 is configured to rotatably couple with the corresponding speaker 1120*a*, 1120*b* at a coupling junction 1106*a*, 1106*b*. In an embodiment, each coupling junction 1106*a*, 1106*b* represents a position on the speaker 1120*a*, 1120*b* wherein the arm 1104*a*, 1104*b* rotatably connects.

According to embodiments of the present disclosure, the coupling junction 1106*a*, 1106*b* is located at a position relative to the speaker 1120*a*, 1120*b* such that a rotary joint is formed. In an embodiment, the rotary joint is configured to provide a single axis of rotation (e.g., axis of rotation 1110*a* for speaker 1120*a*, as shown in FIG. 11) about which the speakers 1120*a*, 1120*b* rotate relative to the corresponding arm 1104*a*, 1104*b* of the headband 1102. For example, in operation, movement of the speaker 1120*a* relative to arm 1104*a* of the headband 802 results in the rotation of the speaker about the axis of rotation 1110*a* to enable transition of the apparatus 1100 from a first position (corresponding to the first listening mode, as shown in FIG. 11) to a second position (corresponding to the second listening mode).

In an embodiment, the axis of rotation 1110*a* extends at an angle of about 45 degrees relative to a midline axis 1124*a* of the speaker 1120*a*. According to one or more embodiments of the present disclosure, the axis of rotation 1110*a* extends at an angle corresponding to an angle of a connector (e.g., pin 1150*a*) relative to the midline axis 1124*a* of the speaker 1120*a*. According to embodiments of the present disclosure, the coupling junction 1106*a*, 1106*b* may include any suitable mechanism for rotatably coupling the speaker 1120*a*, 1120*b* and the respective arms 1104*a*, 1104*b* of the headband 1102 to enable transitioning the apparatus 1100 between the first listening mode and the second listening mode. For example, the coupling junction 1106*a*, 1106*b* may include a male member (e.g., pin 1150*a* in FIG. 11) extending from speaker 1120*a*, 1120*b* corresponding to a female portion or member (e.g., an opening, groove, channel, etc.) of the respective arm 1104*a*, 1104*b*. In another embodiment, the coupling junction 1106*a*, 1106*b* may include a male member extending from the arm 1106*a*, 1106*b* of the headband 1102 for coupling with a corresponding female portion or member of the speaker 1120*a*, 1120*b*.

Figure 12B:
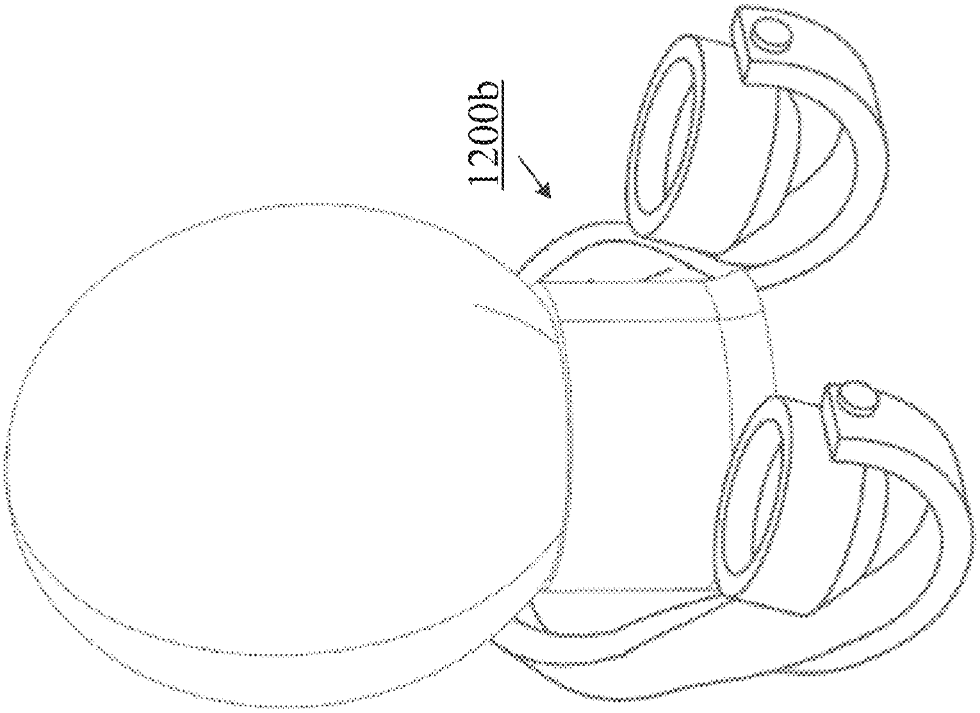
FIGS. 12A and 12B depict perspective views of an exemplary apparatus including a headband having arm portions coupled to a respective speaker at a coupling junction, according to aspects of the present disclosure.
Figure 12A:
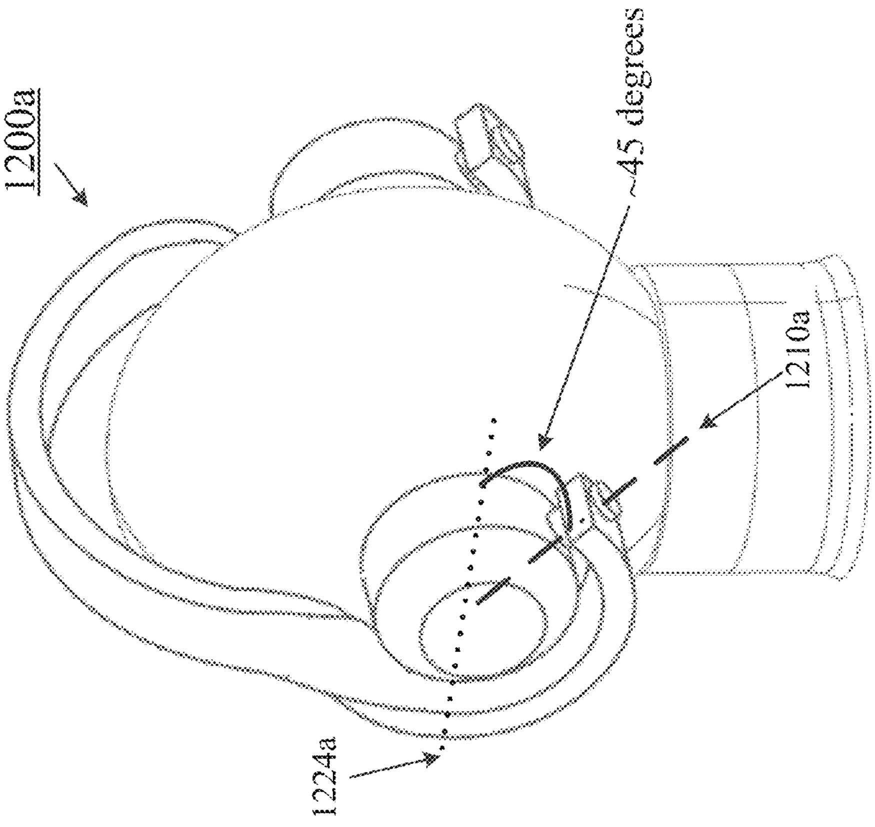

As shown in FIG. 12A, in an embodiment, the axis of rotation (e.g., axis of rotation 1210*a*) extends at an angle of about 45 degrees relative to the midline axis 1224*a*. FIG. 12A depicts an exemplary apparatus 1200*a* in the first listening mode, wherein the apparatus 1200*a* is wearable as a headset by a user. As shown in FIG. 12A, in the first listening mode, the audio emitting portions of the speakers of the apparatus 1200*a* are generally facing toward one another (e.g., for directing sound into the ears of a user wearing the apparatus 1200*a*).

FIG. 12B depicts an exemplary apparatus 1200*b* as it is transitioned from the first listening mode to the second listening mode by rotating the speakers of the apparatus 1200*b* such that two speakers generally face away from one another for amplified playback.

Numerous modifications and variations of the present disclosure are possible in light of the above teachings. It is therefore to be understood that within the scope of the attendant claims attached hereto, embodiments of the present disclosure may be practiced otherwise than as specifically disclosed herein.

What is claimed is:

1. An apparatus comprising:

a headband comprising two opposing ends and a central plane, each of said opposing ends comprises at least two arms, a first arm is longer than a second arm;

at least two speakers, each of said speakers rotatably coupled to said two arms of each of said opposing ends of said headband to form an axis, wherein a rotation of said two speakers transitions said apparatus between a music listening mode and a music playing mode, said axis comprises an angle from about 30 degrees to about 60 degrees relative to said central plane of said headband;

a safety interlocking circuit configured to limit a volume output of each of said two speakers in said music listening mode and increase the volume output of each of least two speakers in said music playing mode, said safety interlocking circuit prevents said apparatus from accidentally entering said music playing mode, wherein said apparatus is placed on a surface during said music playing mode, and said angles provide for said speakers to be at an optimal position during said music playing mode while on the surface.

2. The apparatus of claim 1 wherein said apparatus may be placed around a user's neck during said music playing mode, and said angles provide for said speakers to be at an optimal position during said music playing mode while around the user's neck.

3. The apparatus of claim 1 wherein said axis is at an angle of about 45 degrees relative to said central plane of said headband.

4. The apparatus of claim 1 wherein each of said two speakers is configured to rotate about said axis during the said music listening mode in a range of about 0 to about 100 degrees.

5. The apparatus of claim 1 wherein each of said two speakers is configured to rotate about said axis during said music listening mode in a range of about 0 degrees to about 30 degrees.

6. The apparatus of claim 1 wherein each of said two speakers is configured to rotate about said axis during said music playing mode in a range of about 20 degrees to about 180 degrees.

7. The apparatus of claim 1 wherein each of said two speakers is configured to rotate about said axis during said music playing mode in a range of about 30 degrees to about 170 degrees.

8. The apparatus of claim 1 wherein said headband is configured for positioning on a user's head such that an audio output element of each of said two speakers substantially face toward the user's ears during said music listening mode.

9. The apparatus of claim 1 wherein the at least each of said two speakers is configured for positioning such that audio output elements of each of said two speakers generally face away from one another during said music playing mode.

10. An apparatus comprising:

a headband comprising two end portions and a central plane, each of said end portions comprising an angled hinge having two opposing ends aligned to form a midline axis of said angled hinge, said midline axis has an angle from about 30 degrees to about 60 degrees relative to said central plane of said headband;

at least two speakers, each of said speakers rotatably coupled to each of said two ends of said angled hinge to form two rotary joints, wherein rotation of each of said speakers about a respective axis of rotation between said two rotary joints transitions the apparatus between a music listening mode and a music playing mode; and a safety interlocking circuit configured to limit a volume output of each of said two speakers in said music listening mode and increase the volume output of each of least two speakers in said music playing mode, wherein said safety interlocking circuit prevents the apparatus from accidentally entering said music playing mode, and wherein said apparatus is placed on a surface during said music playing mode and said angled hinges provide for said speakers to be at an optimal position during said music playing mode.

11. The apparatus of claim 10 wherein said angled hinge extends at an angle of from about 45 degrees relative to said midline axis of said first speaker.

12. The apparatus of claim 10 wherein each of said two speakers is configured to rotate about said axis of rotation during the said music listening mode in a range of about 0 to about 100 degrees.

13. The apparatus of claim 10 wherein each of said two speakers is configured to rotate about a respective axis of rotation during said music listening mode in a range of about 0 degrees to about 30 degrees.

14. The apparatus of claim 10 wherein each of said two speakers is configured to rotate about a respective axis of rotation during said music playing mode in a range of about 20 degrees to about 180 degrees.

15. The apparatus of claim 10 wherein each of said two speakers is configured to rotate about a respective axis of rotation during said music playing mode in a range of about 30 degrees to about 170 degrees.

16. The apparatus of claim 10 wherein said headband is configured for positioning on a user's neck such that an audio output element of each of said two speakers substantially face toward the user's ears during said music listening mode.

17. The apparatus of claim 10 wherein the at least each of said two speakers is configured for positioning such that audio output elements of each of said two speakers generally face away from one another during said music playing mode.

18. The apparatus of claim 10 wherein each of said two rotary joints of a first speaker of said two speakers comprises a male member of said angled hinged coupled to a female portion of said first speaker.

19. The apparatus claim 10 wherein said angled hinge and each of said two rotary joints of a first speaker of said two speakers generally limit rotational motion of said two rotary joints to pivot through a generally circular arc around the respective axis of rotation.

20. The apparatus of claim 10 wherein each of said at least two speakers comprises a channel configured to accept a corresponding portion of said headband when the apparatus is in said music listening mode.

21. The apparatus of claim 10 wherein each of said two speakers comprises a channel configured to accept a corresponding portion of said headband when said apparatus is in said music playing mode.

22. The apparatus of claim 10 wherein said two speakers lock into place during said music playing mode.

* * * * *